H. A. YATES.
DERRICK AND HOD SIGNALING SYSTEM.
APPLICATION FILED AUG. 8, 1912.
1,194,458.
Patented Aug. 15, 1916.
8 SHEETS—SHEET 3.
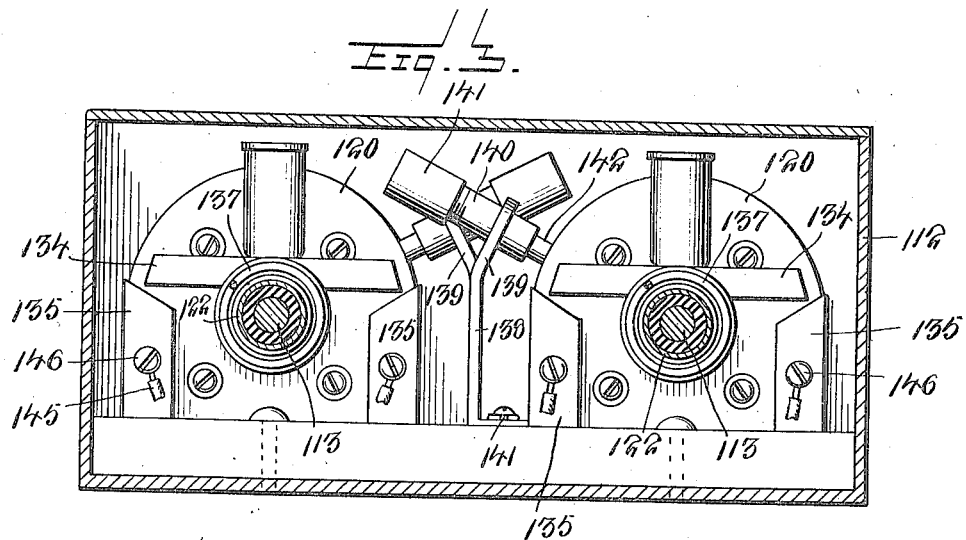
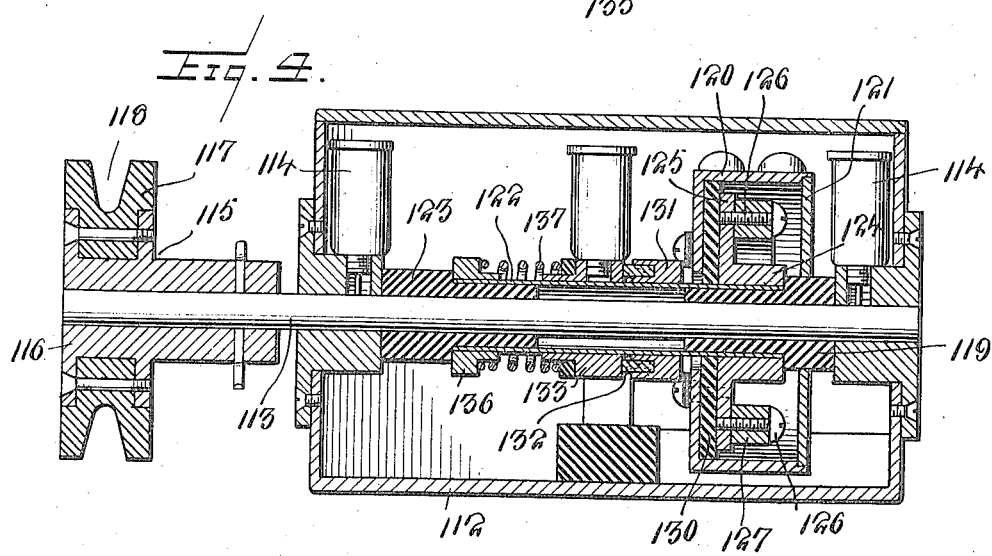
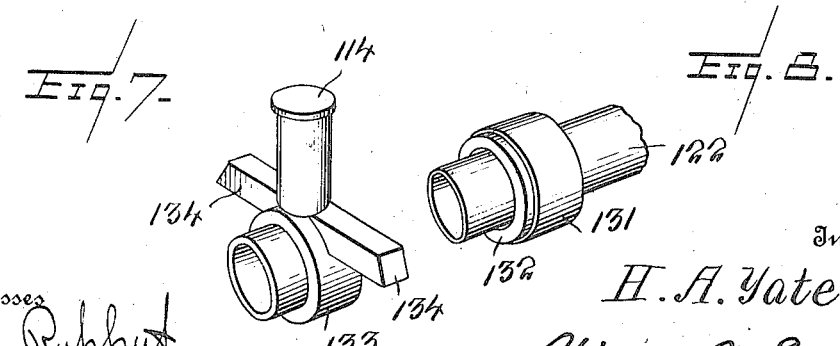
Witnesses
E. Q. Ruppert
John J. McCarthy
Inventor
H. A. Yates
By Victor J. Evans
Attorney H. A. YATES.
DERRICK AND HOD SIGNALING SYSTEM.
APPLICATION FILED AUG. 8, 1912.
1,194,458. Patented Aug. 15, 1916.
8 SHEETS—SHEET 4.
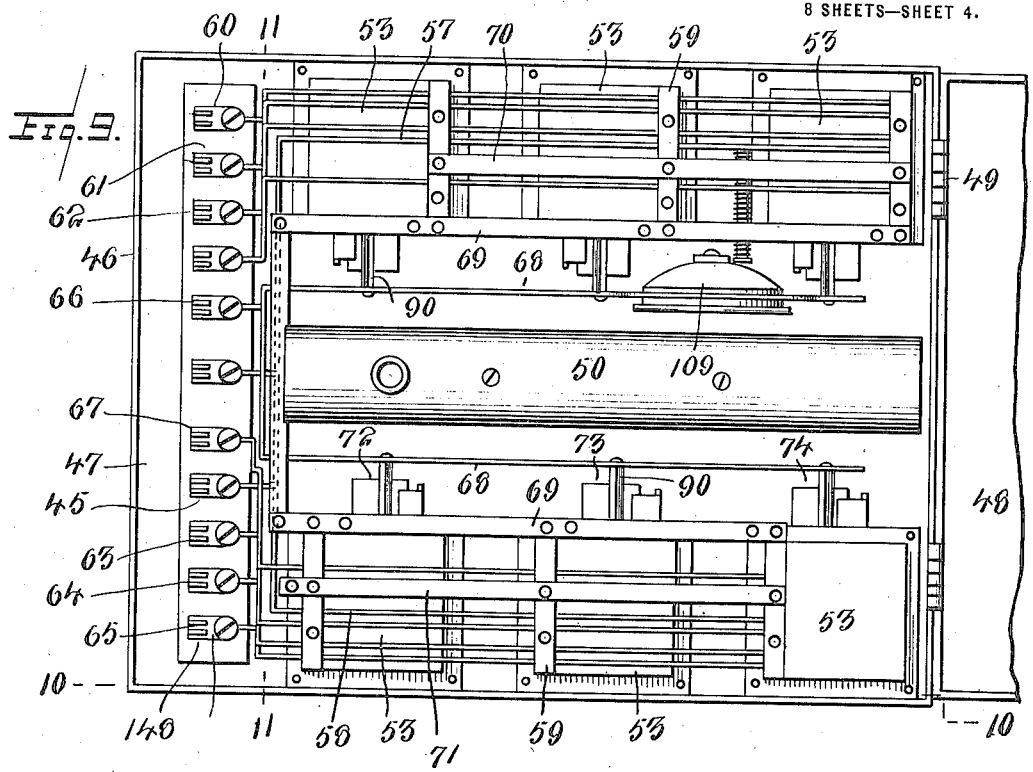
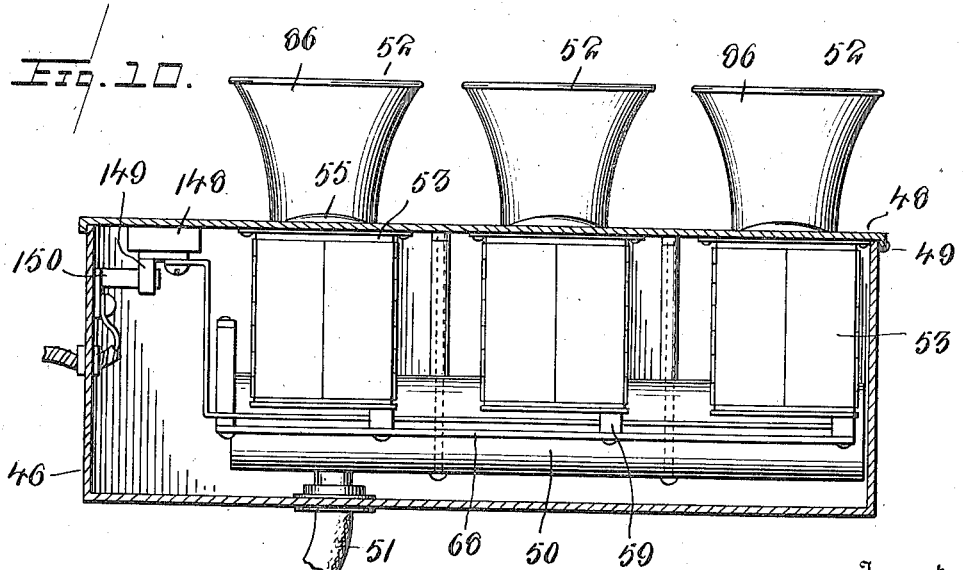

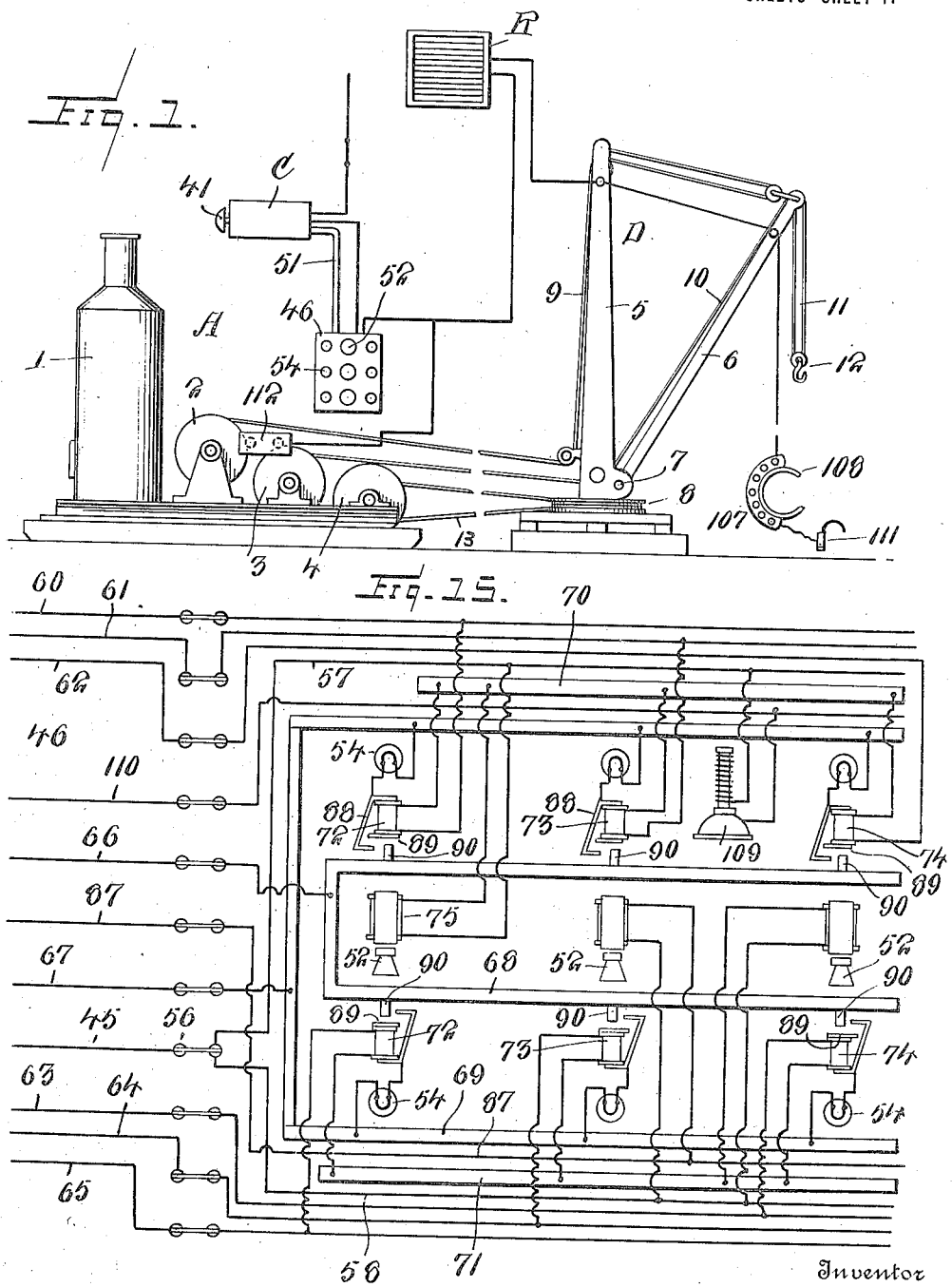

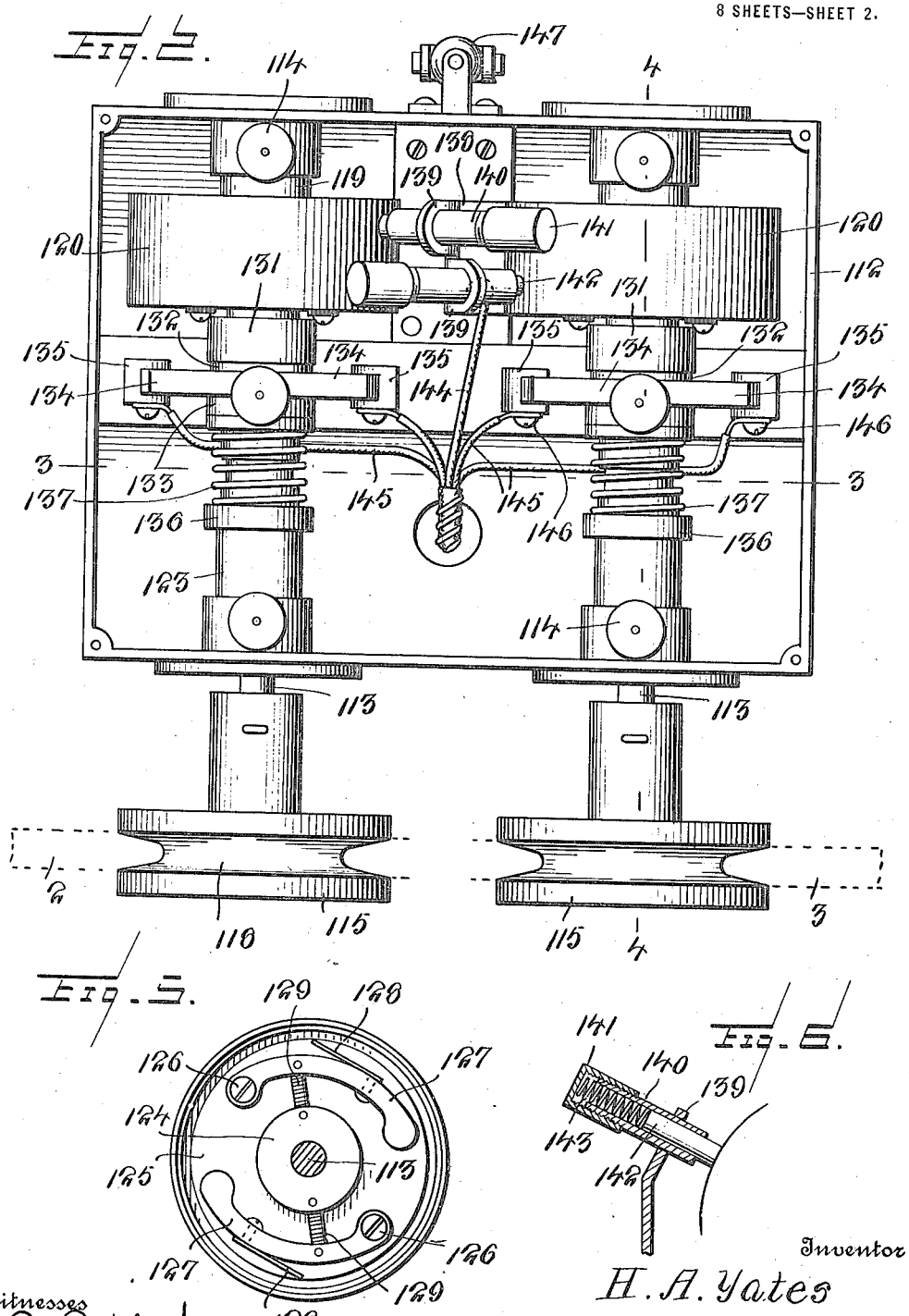

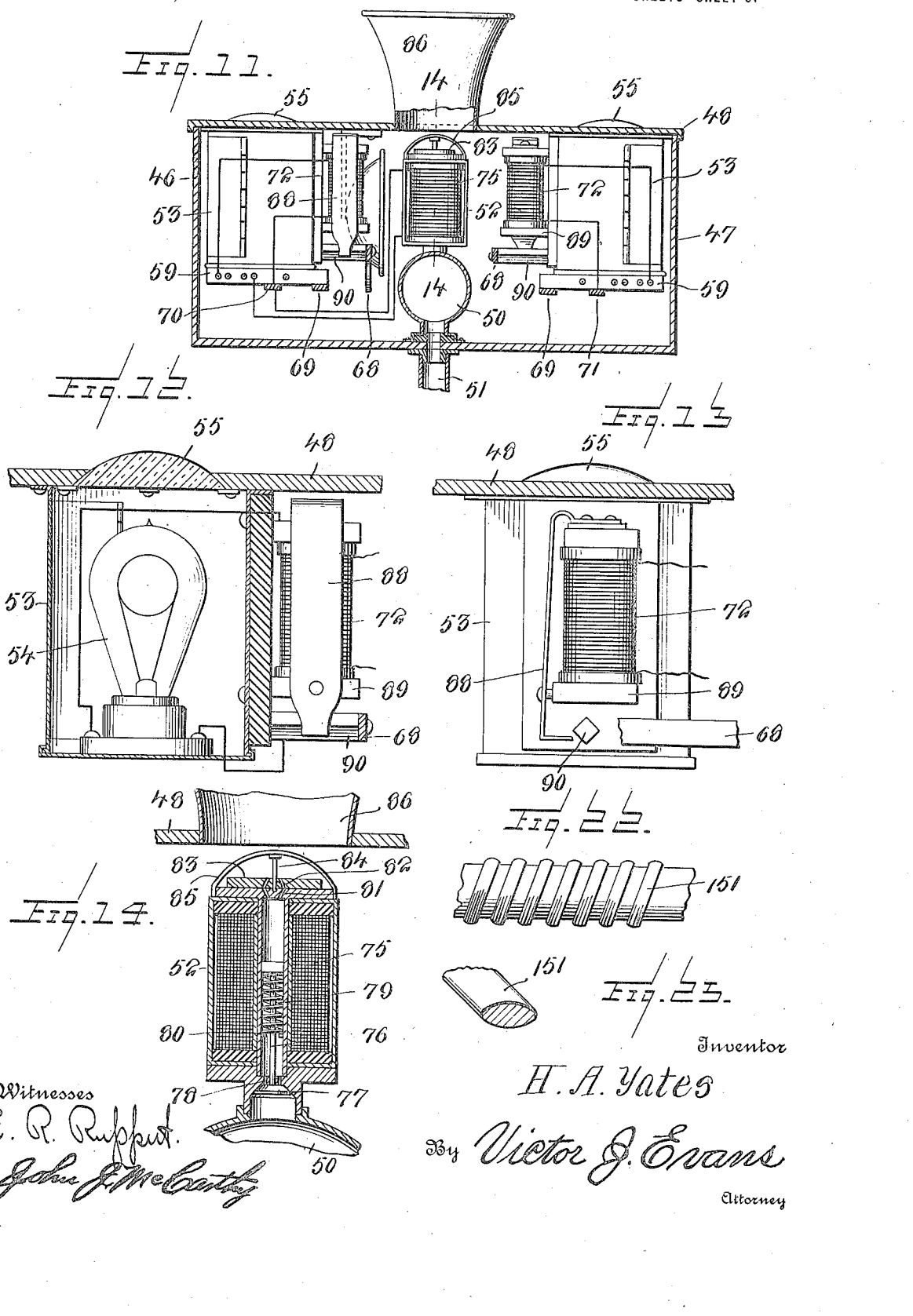

H. A. YATES.
DERRICK AND HOD SIGNALING SYSTEM.
APPLICATION FILED AUG. 8, 1912.
1,194,458.
Patented Aug. 15, 1916.
8 SHEETS—SHEET 6.
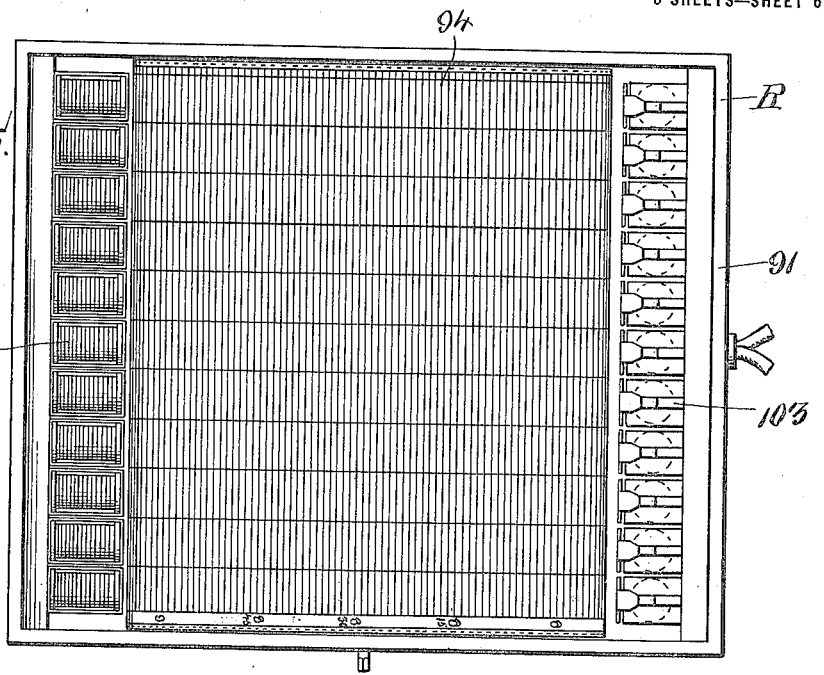
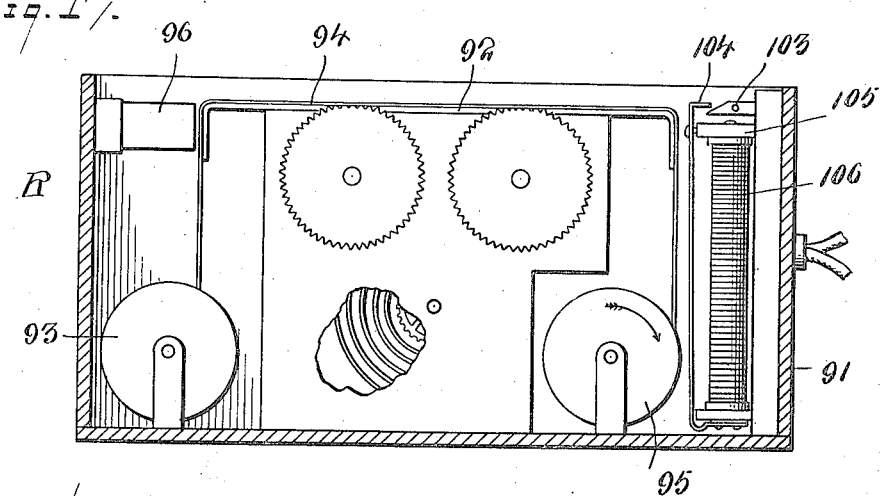
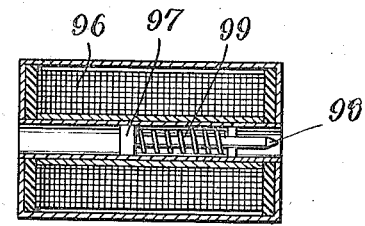
Inventor
H. A. Yates
By Victor J. Evans
Attorney
Witnesses
E. P. Ruppert
John J. McCarthy H. A. YATES.
DERRICK AND HOD SIGNALING SYSTEM.
APPLICATION FILED AUG. 8, 1912.
1,194,458.
Patented Aug. 15, 1916.
8 SHEETS—SHEET 7.
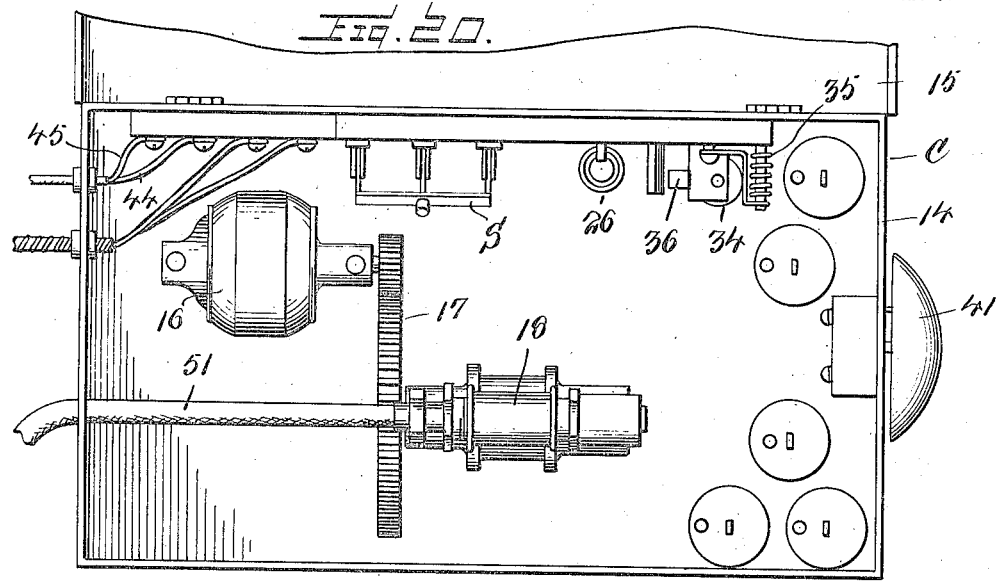
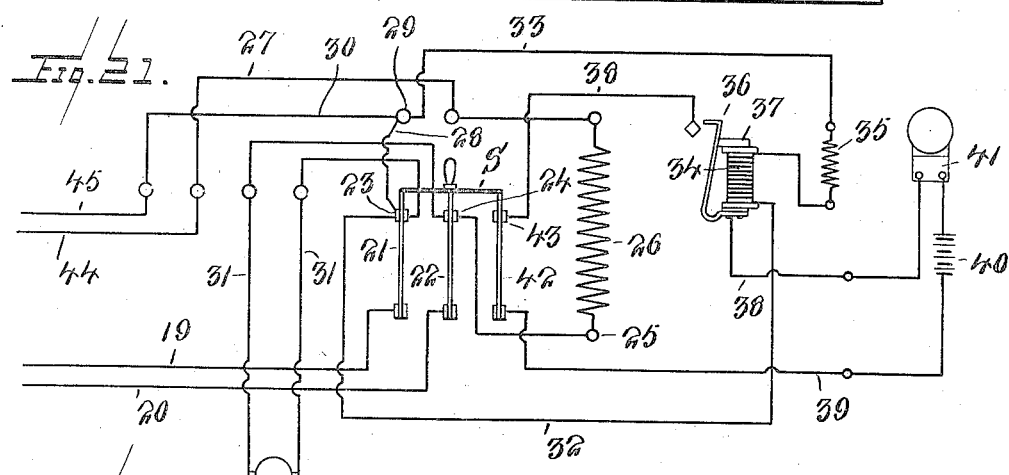
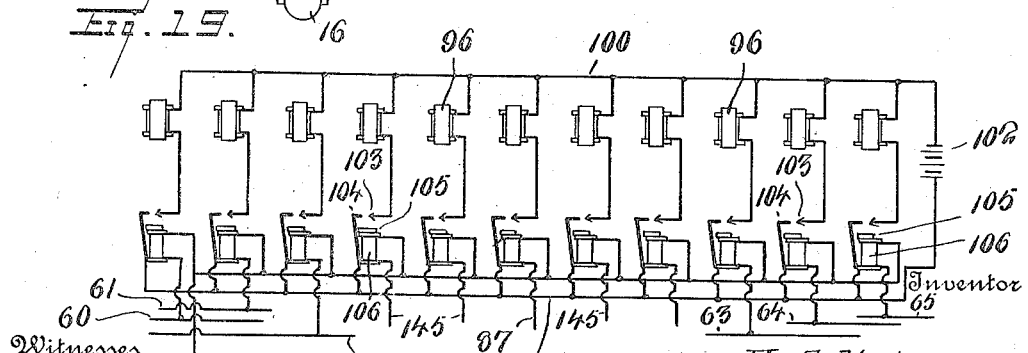
Witnesses
E. P. Ruppert.
John J. McCarthy
Inventor
H. A. Yates
By Victor J. Evans
Attorney

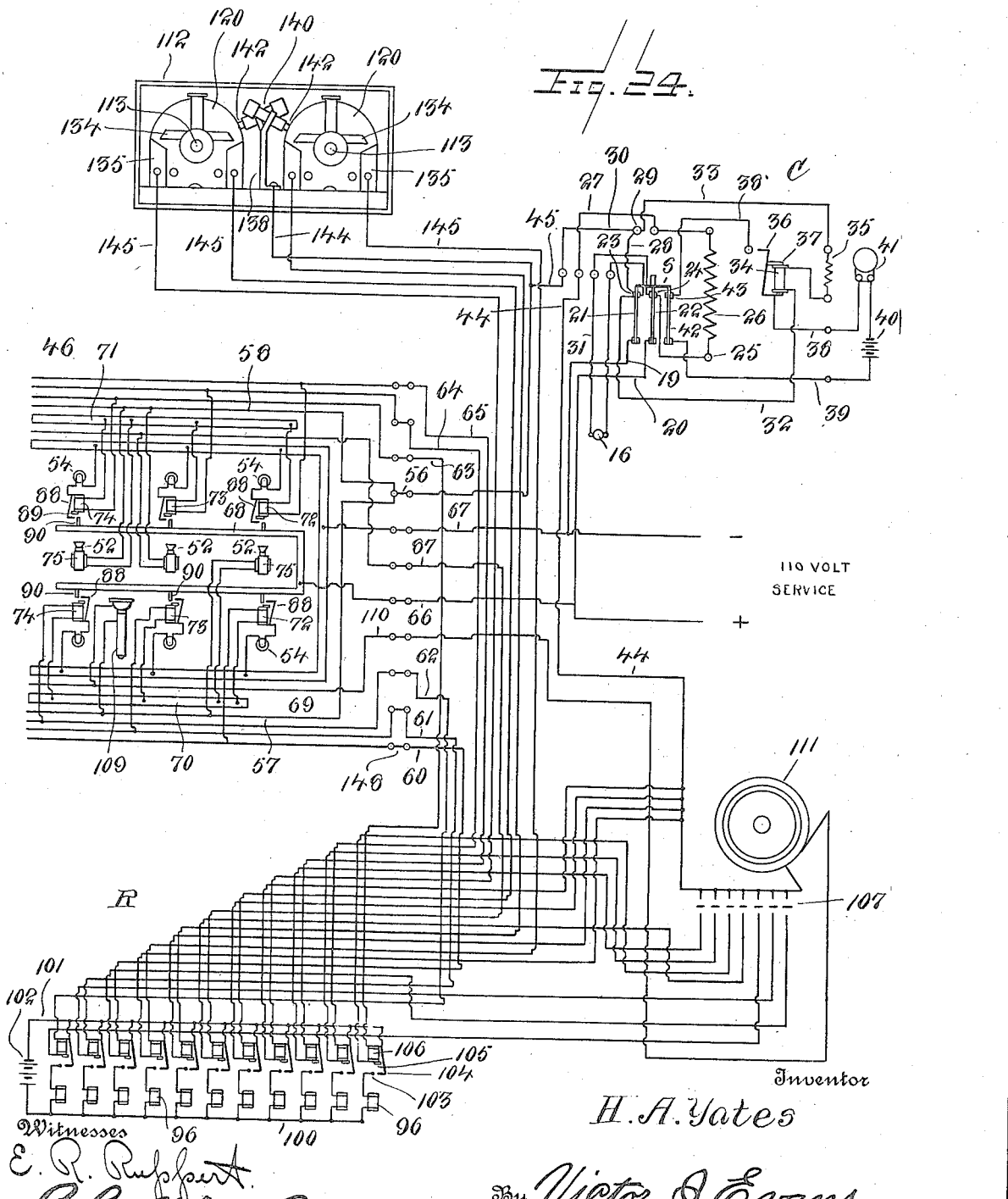

UNITED STATES PATENT OFFICE.

HARRY A. YATES, OF NEW YORK, N. Y., ASSIGNOR TO THE Y & G ELECTRIC FUSE & ENGINEERING COMPANY, A CORPORATION OF NEW JERSEY.

DERRICK AND HOD SIGNALING SYSTEM.

1,194,458.           Specification of Letters Patent.      Patented Aug. 15, 1916.

Application filed August 8, 1912. Serial No. 713,992.

*To all whom it may concern:*

Be it known that I, HARRY A. YATES, a citizen of the United States of America, residing at New York, in the county of New York and State of New York, have invented new and useful Improvements in Derrick and Hod Signaling Systems, of which the following is a specification.

This invention relates to improvements in signaling systems and, in the present instance, has particular application to a signaling system for hoisting apparatus. It is to be understood, however, that the invention in its useful application is not limited to this particular purpose, as the same may be employed in connection with other apparatus, as, for instance, hoisting and hauling mechanism, propelling engines for vessels and the like.

In carrying out the present invention, it is my purpose to provide a signaling system whereby orders or other intelligence may be transmitted, the sending of such orders recorded for future reference or to prevent controversy between the sender and the receiver in the event of the order being missent or disobeyed, and the execution of the order recorded.

Furthermore, I aim to provide a system of the character set forth by means of which various signals may be transmitted to the engineer in charge of a power plant so that he may control his engine, or engines as the case may be, accordingly and wherein the sender will be advised automatically as to the proper working of the signal.

It is also my purpose to provide a signaling system wherein, in the event that a rupture or break occurs in any part of the apparatus, an alarm will be sounded to notify the persons in charge of the break.

A still further object of the present invention is the provision of a system of the type described which will embrace the desired features of efficiency, durability and reliability coupled with cheapness of cost in installation and maintenance and which will be constructed in such manner that access may be had to the various mechanisms with ease and facility for repairing and cleaning.

With the above and other objects in view, the invention consists in the construction, combination and arrangement of parts hereinafter set forth in and falling within the scope of the claims.

In the accompanying drawings; Figure 1 is a diagrammatic view of a signaling system constructed in accordance with the present invention, the same being employed in connection with a hoisting apparatus. Fig. 2 is a top plan view of the circuit closers for affecting the recorder in the carrying out of the order transmitted, the top of the casing being removed. Fig. 3 is a transverse sectional view through the circuit closers. Fig. 4 is a longitudinal sectional view through one of the circuit closers. Fig. 5 is a view in elevation or detail of one of the circuit closers. Fig. 6 is a sectional view through one of the brushes of a circuit closer. Figs. 7 and 8 are perspective views of certain parts of the circuit closer. Fig. 9 is a bottom plan view of the cover of the signal box showing the mechanism carried thereby. Fig. 10 is a longitudinal sectional view through the signal box. Fig. 11 is a transverse sectional view of the same on the line 11—11 of Fig. 9. Fig. 12 is an enlarged sectional view through a portion of the signal box, parts being shown in elevation. Fig. 13 is a view similar to Fig. 12 at right angles thereto. Fig. 14 is a vertical central sectional view through one of the audible signals employed in the system. Fig. 15 is a diagrammatic view of the signal box. Fig. 16 is a top plan view of the recorder, the cover being removed. Fig. 17 is a transverse sectional view of the recorder. Fig. 18 is a longitudinal sectional view of a detail of the recorder showing one of the pencils and the actuating device therefor. Fig. 19 is a diagrammatic view of the operating mechanism for the pencils of the recorder. Fig. 20 is a top plan view of the main casing of the system showing the mechanism uncovered. Fig. 21 is a diagrammatic view of the mechanism contained in the main casing. Fig. 22 is a fragmentary view of the main cable of the system. Fig. 23 is a fragmentary perspective view of the wrapping or binding for the main cable. Fig. 24 is a diagrammatic view of the circuit connections.

Referring now to the accompanying drawing in detail, the letter A indicates a hoisting engine as an entirety composed, in the present instance, of a boiler 1, a boom drum 2, a load drum 3 and a swinging drum 4. This hoisting engine operates a derrick or crane D which, in this instance, comprises a standard or mast 5, a boom 6 pivoted to the mast adjacent to the lower end of the latter as at 7, and a turn table 8 upon which the mast is mounted. Connected at one extremity to the upper end of the mast 5 and trained over the sheave connected to the free end of the boom 6 and thence over another sheave carried by the mast at the upper end thereof and one adjacent to the lower end thereof is a boom cable 9 fastened to and wrapped about the drum 2. Similarly, a load cable 10 has one end fastened to the upper extremity of the boom 6 and has a loop or fall portion 11 carrying a load hook 12, the load cable being trained over a sheave journaled in the upper end of the boom thence passed around a sheave at the lower end of the mast and fastened to and wrapped about the load drum 3. Leading from the drum 4 is a cable 13 trained about the grooved periphery of the turn table 8 and adapted, in the revolving of the drum 4, to swing the derrick in one direction or the other, according to the direction of rotation of the respective drum. The hoisting engine and derrick herein shown and described form no part of the present invention but have been shown, merely, for the purpose of illustrating one application of the present invention.

The main casing of my improved signaling system is denoted by the letter C and is conveniently located with respect to the engineer in charge of the hoisting engine and is preferably, although not necessarily, composed of a rectangular receptacle 14, shown in Fig. 20, having a hinged cover or lid 15. Mounted within the main casing and appropriately fastened therein is a suitable form of electric motor 16 geared or otherwise connected as at 17 to an air compressor or the like 18. Leading into the casing C are two electric current carrying conductors 19, 20 constituting the main circuit of the system and terminally connected to the blades 21, 22 respectively of a three blade knife switch S. The blades 21, 22 of the switch, when the latter is closed, engage suitable contacts 23, 24 respectively and from the contact 24 of the blade 22 leads a conductor 25 forming, in effect, a continuation of the conductor 20 and includes in series a resistance 26 from which latter leads a conductor 27 acting as a continuation of the conductor 20, while from the contact 23 leads a conductor 28 terminating in a binding post 29 to which is connected one end of a conductor 30, the latter being a continuity of the conductor 19. Thus, it will be seen that the current entering the main casing of the system by way of the leads 19 and 20 of the main circuit, is cut down to the required voltage, before leaving the main casing. Tapped onto the contacts 23, 24 are the terminals of conductors 31, 31 forming a shunt around the main circuit and including in series the motor 16 of the air compressor. Also connected in the main circuit on a shunt composed of the wires 32 and 33 terminally connected to the contact 23 of the switch and the binding post 29, is an electromagnet 34, a suitable resistance 35 being placed in the shunt circuit composed of the conductors 32 and 33 to prevent excessive current from entering the magnet. Suitably fastened within the casing C is a spring contact 36 provided with an armature 37 disposed within the influence of the magnet 34 and controlling a local alarm circuit composed of conductors 38 and 39 and including in series a suitable source of electrical energy as a battery 40, and an audible alarm as a bell 41. The remaining blade 42 of the switch S is adapted to engage a contact 43 forming the terminal of the conductor 38, while the free terminal of the conductor 39 is connected to the pivot post of the blade 42. From this, it will be seen that the terminals of the conductors 38 and 39 of the local alarm circuit are interconnected when the triple blade switch is in closed position, while the local circuit remains open at the contact 36 in the normal condition of the main circuit. Should a rupture or break occur in the main circuit, the magnet 34 will be deënergized and the armature 37 relieved of the influence of such magnet as a consequence whereby the spring contact 36 will move to a position to close the local circuit and so bring about the operation of the alarm 41, thereby notifying those in charge that the system is out of working order. The alarm 41 is preferably arranged upon the exterior of the main casing C, as shown in Fig. 20, although the alarm may be located at a point remote from the casing and immediately adjacent to the hoisting engine, if such is found advisable.

Leading from the main casing C are conductors 44 and 45 forming continuations of the conductors 27 and 30 respectively. Located in proximity to the engineer in charge of the hoisting engine and at an appropriate distance from the main casing is a signal box indicated as an entirety by the reference numeral 46 and arranged in such manner as to be within the vision of the engineer. This signal box may be constructed of any suitable material and in any desired manner and in the present instance comprises a rectangular receptacle 47, shown in Figs. 9 and 10, having a hinged cover 48 appropriately connected thereto as by hinges 49. Arranged within the box and disposed longitudinally thereof is an air receiver or tank 50 connected to the bottom of the box in any preferred manner and in communication with the air compressor 18 within the main casing C by way of a conduit 51 whereby the air compressed within the compressor 18 under the action of the motor 16 may be forced into the tank or receiver. Arranged upon the receiver 50 and adapted to have communication therewith are a plurality of audible signals 52, three being shown as an example, the audible signals being preferably in the form of sirens, whistles or the like. Secured to the under surface of the cover 48 of the signal box and depending within the box at each side of the air receiver and signals carried thereby are a number of containers 53 each housing a visual signal as an incandescent lamp 54. In the present instance, three of such containers are shown upon each side of the air receiver, commensurate with the range of signals. The top or cover of the signal box over each container and incandescent lamp therein, is provided with an aperture receiving a bull's eye 55, the bull's eyes upon each side of the cover being of various colors as, for instance, white, green and red, the whites being arranged to the left of the box as illustrated in Fig. 15, while the green and red follow in the order named.

Leading into the switch box 46 and terminating in a contact 56 is the conductor 45 of the main circuit which conductor may be termed the common power conductor. The conductor 45 is designed to have electrical communication with branch conductors 57, 58 arranged upon the opposite sides of the signal box and supported by strips 59 arranged upon each side of the casing transversely thereof and connected to the lower surfaces of the containers 53, the strips on each side being provided with alining apertures to receive the conductors. Also arranged longitudinally of the signal box upon each side thereof and supported by the respective strips 59 are a plurality of, what may be termed, signal conductors 60, 61 and 62, and 63, 64 and 65, the conductors 60, 61 and 62 being arranged upon one side of the box while the conductors 63, 64 and 65 are disposed along the opposite side of the box, all of such signal conductors being capable of selective connection with the power conductor 45 in a manner hereinafter described. Conductors 66 and 67 are also carried into the signal box and constitute a lighting circuit for the various signal lamps within the box. The conductor 66 of the lighting circuit is terminally connected to a bus bar 68 which, in the present instance, is of substantially U-shape and secured to the lower edges of the strips 59, while the free terminal of the other conductor 67, of the lighting circuit is connected to a bus bar 69 of U-form in this case and having the limbs spaced apart a distance greater than that between the limbs of the first bus bar, the bus bar 69 being also secured to the lower edges of the strips 59. Disposed within the signal box at the opposite sides thereof and suitably fastened to the lower edges of the strips 59 and insulated therefrom are longitudinally extending bus bars 70, 71 arranged in parallelism with the limbs of the bus bars 68 and 69. In the present instance, three controlling relays 72, 73 and 74 are located upon each side of the signal box and the relays upon one side each have one terminal connected with the signal conductors 60, 61 and 62 respectively and have the free terminals thereof tapped onto the respective bus bar 70, while the controlling relays at the opposite side of the box each have one terminal connected with the signal conductors 65, 64 and 63 respectively and have their free terminals connected to the respective bus bar 71, as clearly illustrated in Fig. 15 of the drawings.

Each siren or whistle is electrically controlled and in the present instance, as clearly shown in Fig. 14, embodies a solenoid 75 within the bore of which is mounted a core or plunger 76 carrying a valve 77 controlling passages 78 formed in one end wall of the bore in the solenoid and adapted to have communication with the air receiver when the valve is open, a coiled contractile spring 79 encircling the plunger and having one end in engagement with the head of such plunger while the opposite end bears upon lugs 80 formed in the bore of the solenoid, the spring acting to hold the valve 77 normally closed. The upper end of the bore in each solenoid is provided with angle passages 81 adapted to register with similar passages 82 formed in a disk 83 adapted to rotate about a post 84 when the valve 77 is open and the air from the container passes through the angle passages 81 and 82, the noise resulting from the rapid rotation of the disk 83 giving the warning signal. The pivot post 84 of each siren may be supported in any suitable manner. In the present instance, one extremity thereof is disposed within a yoke 85 having the opposite ends thereof suitably fastened to the top of the solenoid. Each siren is also equipped with the usual amplifying horn 86 suitably supported in proximity to the revolving disk. The controlling solenoid of the siren 52 at one end of the signal box (the siren to the left in Fig. 15) has one terminal of its winding tapped onto the branch conductor 57 and the opposite terminal thereof connected to the bus bar 70, while the siren at the opposite end of the box (the one to the right in Fig. 15) has one terminal connected to the branch conductor 58 and the opposite terminal thereof secured to the bus bar 71. One terminal of the winding of the solenoid of the center siren or whistle is also tapped onto the branch conductor 58, while the opposite terminal of such winding is connected to a conductor 87 leading out of the signal box and capable of selective connection with the signal conductors aforementioned, with the common power conductor 45. One terminal of each of the signal lamps is tapped onto the bus bar 69 while the opposite terminal of such lamp is connected to a spring contact 88 having a pole piece 89 disposed within the influence of the respective controlling relay and adapted to contact with a lug 90 extending outwardly of the bus bar 68.

From this construction, it will be seen that if the common power conductor 45 and any one of the signal conductors 60, 61 and 62, or 65, 64 and 63 are bridged, current will flow into the respective controlling relay 72, 73 or 74, the respective bus bar 70 or 71, and the controlling relay of the particular siren or whistle, from the common power conductor 45 by way of the branch conductor 57 or 58, as the case may be. Upon the energization of one of the controlling relays 72, 73 or 74, the corresponding pole piece 89 will be magnetized by such relay and the particular armature contact 88 brought into engagement with the adjacent lug 90. In this condition of the controlling relay, the lighting circuit to the particular lamp is closed from one of the conductors of the lighting circuit, for instance, the conductor 66 and the current flows from such conductor into the lamp by way of the bus bar 68, the lug 90 and the contact 88 controlled by the energized relay. The free terminal of the lamp being tapped onto the bus bar 69 and the latter in electrical communication with the conductor 67 of the lighting circuit, the bus bar 69 and conductor 67 form the other side of the circuit, as is readily understood. On the other hand, should the conductor 87 and the common power conductor 45 be bridged, current will flow from the last-named conductor through the winding of the controlling solenoid of the center siren or whistle, thence into the conductor 87, thereby sounding said siren without producing the energization of any of the signal lamps.

It will be noted that, should any one of the signal conductors and the common power conductor be bridged, the controlling relay in such bridged signal conductor will be connected in series with one of the sirens or whistles, thereby giving audible and visual signals simultaneously, thus attracting the attention of the engineer, should he be not looking at the signal box or at a point remote from the engine.

The various signal lamps at one side of the signal box and the siren associated therewith constitute one set of signals, while the signal lamps at the other side of the signal box and the siren associated therewith constitute another set of signals, the center siren also forming a signal different from the others. For instance, in the application of the invention to a hoisting apparatus, the white, green and red signals at one side of the box would constitute speed signals for the boom cable drum, while the similarly colored signals at the other side of the box would constitute like signals for the load cable drum, the lone siren 52, that is the siren independent of the visual signals, constituting a swinging signal to indicate that the derrick should be swung.

In the embodiment of my invention selected for illustrative purposes, I have for convenience and compactness described and delineated a particular form of signal box and arrangement of signals therein. It is to be understood, however, that I do not confine myself to any set type of box or arrangement of signals, relays, etc., therein, as the various elements within the box may be arranged in any convenient or desired manner.

In order to prevent or avoid controversy between the sender and the receiver of the signals in the event of the signal being miscarried and to produce a permanent record of the signals transmitted as well as the signal carried out or executed, I employ a recorder or register R which is preferably connected in multiple as shown in Fig. 4, with the signal box so that, previous to the signal reaching the engineer or other person to be signaled, the nature of the signal will be registered or recorded. This recorder or register may be located in the vicinity of the other mechanisms of the system, or at a distant point, as desired and, in this embodiment of my invention includes a suitable casing 91, as shown in Figs. 16 and 17, carrying, adjacent to its front wall, a supporting strip 92 having the opposite ends thereof downturned and spaced apart from the respective side walls of the casing. Rotatably mounted within a suitable bearing secured to the bottom or rear wall of the casing is a spool or drum 93 from which is taken and passed over the supporting strip 92, a record sheet 94 the latter having the free end thereof connected to a second drum or spool 95 journaled in bearings secured to the rear wall of the casing and spaced an appropriate distance from the drum 93. This record sheet may be marked in any suitable or desired manner and any suitable mechanism may be employed for moving the record sheet over the supporting sheet and wrapping the same about the drum 95. In practice, I have found clock work as illustrated in Fig. 17 suitable and efficient for this purpose. The record sheet is preferably divided into longitudinal spaces by longitudinally disposed lines suitably spaced apart as illustrated in Fig. 16, while I also preferably mark the sheet transversely by lines spaced apart distances to represent minutes or other intervals of time. Arranged along one side wall of the casing 91 of the recorder or register and suitably connected thereto are a plurality of solenoids 96 each having a plunger 97 equipped with a pencil or other form of marking device 98 adapted to contact the record sheet upon one of the longitudinal space portions thereof, a coiled expansion spring 99 encircling each plunger and acting to hold the pencil normally out of contact with the respective portion of the record sheet. These solenoids 96 are preferably arranged in alinement within the recorder casing and each is disposed opposite to one of the space portions on the record sheet so that, upon the energization of any solenoid, the pencil controlled thereby will be projected onto the respective space portion of the record sheet to mark the same. The pencil controlling relays 96 are, in the present instance, connected in multiple or parallel with conductors 100, 101, as shown in Figs. 19 and 24, forming a local circuit including a suitable source of electrical energy, as a battery 102. Arranged in one wire of each solenoid 96 is a stationary contact 103 and a movable armature contact 104 preferably of a springy nature and provided with a pole piece 105 disposed within the influence of an electromagnet 106. The pole pieces 105 and electromagnets 106 form relays and each controls an individual solenoid. Thus, upon the energization of one of the relays, the solenoid 96 controlled thereby will be energized from the local circuit with the effect to mark the record sheet as previously described. One terminal of certain of the magnets of the relays within the recorder or register casing, for example the three magnets at each end of Fig. 19, are tapped onto the signal conductors 60 to 65 inclusive leading out of the signal box, while the remaining terminals of such magnets are connected to the conductor 44 which latter may be termed the common return conductor of the system. Thus, it will be seen that the signal box and register are connected in multiple with each other so that when the main circuit is closed to transmit a signal, such signal is registered or recorded. The conductor 87 extending out of the signal box has also connected thereto one terminal of a magnet of the register, for instance, the center magnet in Fig. 19, the opposite terminal of the last-named magnet being tapped onto the common return conductor 44.

In order that predetermined signals within the signal box may be selected and influenced by the main circuit independently of the remaining signals, any suitable means may be employed. In the present instance, I extend the various wires or conductors 60 to 65 inclusive and 87 and the common return conductor 44 from the recorder casing and employ push buttons 107 to connect the signal conductors with the common return conductor 44, the several push buttons being carried by a belt 108 designed to be worn by the party transmitting the signal.

A suitable form of sound transmitter 109 is preferably, although not necessarily, mounted within the signal box and has one terminal connected with the branch conductor 57 of the common power conductor 45, while the opposite terminal thereof is fastened to a conductor 110, the latter leading to a receiver 111 on the belt 108, the free terminal of the receiver being connected to the common return conductor 44. This receiver is adapted to be utilized by the sender of the signals so that the sounds resulting from the sirens may be heard, incident to the transmitter being in close proximity to the signal box.

The operation of the system thus far described may be briefly stated as follows:

Let it be assumed that the incandescent lamps to the right of the signal box shown in Fig. 1 control the movements of the boom, while those to the left of such box control the load cable. Let it be further assumed that the person wearing the belt 108 has the buttons thereon arranged or located in front of him, the button on the extreme right hand side of the belt being the first button, while that to the extreme left is the last, the three buttons at the right hand side of the belt controlling the boom signals, while the three buttons on the left hand side of the belt and the center button control the load signals and the swinging signal or independent siren, respectively. To signal the engineer to lower the boom slowly, the button at the extreme right hand of the belt is depressed twice whereby the conductor 60 and the common return conductor 44 are bridged thereby placing the relay 72 in the conductor 60 and the respective siren 52 in series with each other and connecting said relay and siren across the main circuit, as will be readily understood. When the relay 72 becomes active, the signal lamp controlled thereby and having the white bull's eye is bridged across the lighting circuit. Thus, an audible and visual signal is given the engineer so that he may control his engine accordingly. Previous to the operation of the signals within the signal box, however, the relay within the register casing associated with the conductor 60 is bridged across the last-named conductor and the common return conductor 44, thereby closing the local circuit of the register and causing the actuation of the respective pencil to mark on the record sheet the sending of the signal. Suppose it is desired to lower the boom at a considerable speed. To accomplish this, the second button on the belt is depressed, thereby bridging the signal conductor 61 and the common return conductor 44. At this time, the relay 73 controlling the lamp of the boom signals having the green bull's eye is energized with the effect to bridge the said lamp across the lighting circuit and place the energized relay and the respective siren in series with each other and across the main circuit. To stop the boom in its path of travel, the third button is depressed whereby the conductor 62 and the common return conductor 44 are bridged to bring about the energization of the signal lamp having a red bull's eye and the respective siren. It will, of course, be understood that the respective relays of the register associated with the conductors 61 and 62 are bridged across said conductors and the common return conductor to cause the actuation of the recorder, previous to the operation of the signals and as aforedescribed in connection with the slow speed signal. The speed signals of the load cable are controlled from the three buttons at the left of the belt and upon the depression of any one of the last-named buttons, the recorder relay and the visual and audible signals controlled from the respective button are affected as previously described in connection with the boom signals. To swing the derrick to the right, the center button is depressed once, for instance, thereby bridging the conductor 87 and the common return conductor 44 with the effect that the center or lone siren in the signal box is sounded. To stop the swinging of the derrick, the center button is again depressed once, while to swing the derrick in the opposite direction or to the left, the center button is depressed twice.

In practising my invention I employ circuit closers operable from the various cable drums of the hoisting apparatus and connected with the remaining relays of the register or recorder in such manner that the movement of the drums are recorded so that, in case of necessity, as when signals have been miscarried or disobeyed, the record of the transmitted signal may be compared with the markings on the record sheet produced by the movements of the drums. These circuit closers hold the respective relays of the recorder energized for the full length of time that the drums are working in either direction so that the working time of the drums may be registered. The circuit closers also operate and cause the actuation of the respective pencils controlled thereby independently of the other mechanisms of the system thus enabling the exact movements of the drums to be determined. In the present embodiment of my invention, I employ but two of these circuit closers, one for the drum of the load cable and the other for the boom drum. It is to be understood, however, that I may employ as many of such circuit closers as necessary, the capacity of the recorder being correspondingly increased. The aforementioned circuit closers are, in the form of my invention herein shown, incased within a suitable housing 112, as shown in Fig. 4, and each includes a shaft 113 arranged transversely of the casing or housing and journaled in the opposite side walls thereof, the bearings carrying suitable lubricating cups 114, 114 to keep the shaft properly oiled. These shafts are appropriately spaced apart and each has one extremity extending outwardly of the respective wall of the housing and to such extremity is rigidly secured in any suitable manner a bearing wheel 115 composed of a metallic hub 116 and a fiber or other form of detachable bearing rim 117 having a peripheral groove 118 adapted to engage the flange of the respective drum and impart movement to the shaft in the turning of the drum. Keyed or otherwise secured upon each shaft within the housing is an insulating bushing 119 carrying an annular metallic drum 120 equipped with a removable end wall 121 by means of which access may be had to the interior thereof. The insulating bushing 119 of each circuit closer is provided with a circumferentially reduced portion and embracing such portion and extending a short distance along the length of the respective shaft 113 concentrically thereof is a metallic conducting sleeve 122 having the free end thereof surrounding the reduced portion of a bushing 123 similar to the bushing 119 and suitably secured to the shaft at a distance from the last-mentioned bushing. Sweated or connected in any other suitable manner to the portion of the conducting sleeve 122 within the drum 120 is a collar 124 provided with a circumferentially extending flange 125 having pivoted thereto at diametrically opposite points as at 126, 126 weighted contacts 127, as shown in Fig. 5, responsive to the action of centrifugal force and provided with contact fingers 128 adapted in the outward movement of the weighted contacts under the action of centrifugal force to engage the inner surface of the cylindrical wall of the drum, springs 129 each having one terminal fastened to the collar 124 and the opposite end secured to the respective weighted arm 127, such springs acting to hold the weighted contacts against the action of centrifugal force and the fingers 128 away from the respective or adjacent surface of the drum. The closed end wall of the drum 120 is provided with a relatively large opening around the conducting tube 122 so that contact between the drum and the tube or sleeve is avoided, while the said side wall of the drum is bolted to the circumferentially extending flange 125 on the collar 124 and insulated from such flange by a disk 130 of insulating material. Rigidly secured to the conducting tube or sleeve 122 and encircling the same adjacent to the closed side wall of the drum is a thrust collar 131 equipped at one end edge with suitable bearing material 132 as felt or the like, as shown in Figs. 7 and 8. Frictionally engaging the conducting sleeve 122 adjacent to the thrust collar 131 is a contact ring 133 carrying oppositely disposed laterally extending contact bars 134, 134 adapted to engage one or the other of a pair of contact posts 135 suitably fastened to the lower wall of the housing 112 and insulated therefrom and disposed at the opposite sides of the collar 133 of each circuit closer.

Surrounding the conducting sleeve or tube 122 at the end remote from the drum 120 is a bearing nut or collar 136 and encircling the conducting tube between the bearing nut and the contact ring 133 is a coiled expansion spring 137 having one end abutting the nut 136 and the opposite end in engagement with the contact ring, the spring exerting its tension to hold the contact ring in engagement with the thrust collar. This contact ring, as before stated, frictionally engages the conducting tube and in the initial movement of the respective shaft 113 under the action of the drum, the contact collar and the bars thereon rotate with the shaft until one or the other of the bars engages one of the posts 135, at which time the contact ring remains stationary while the shaft continues to rotate, the engaged contact bar and post abutting each other as long as the shaft continues to revolve in the same direction. When the shaft rotates in the opposite direction the contacting bar and post are disengaged and the opposite bar brought into contact with the other post of the pair, as illustrated in Figs. 2 and 4. Suitably fastened to the lower wall of the housing 112 and extending upwardly between the drums 120, 120 of the circuit closers is a standard 138 having the upper end thereof split to provide upwardly inclined ears 139, 139 extending in opposite directions. Each ear 139 carries a brush holder composed of an open ended tube 140 having one end threaded exteriorly to receive a cap 141 and into each tube is inserted a brush 142 having one end bearing upon the peripheral surface of the respective drum 130, while the opposite end thereof is engaged by an expansion spring 143, as illustrated in Fig. 6, disposed within the tube and having the free end thereof abutting the cap 141, each spring 143 exerting its tension to force the brush 142 into contact with the periphery of the respective drum 120. Fixed to a suitable binding post on the standard 128 is one terminal of a conductor 144 while the opposite end of such conductor is tapped onto the common power conductor 45 of the system. Similarly, conductors 145 each have one end connected to the individual contact posts 135 by means of binding posts 146 and have the free terminals thereof connected to the remaining magnets 106 of the relays within the recorder casing, the free ends of the windings of said magnets being tapped onto the common return conductor 44. From this, it will be seen that the drum actuated circuit closers are connected or bridged across the main circuit of the system in multiple or parallel and function independently of the remaining mechanisms. The casing or housing 112 of the drum operated circuit closers is connected to an appropriate part of the hoisting apparatus by means of a universal or other hinge joint 147 so that the bearing wheels 115 of the shafts of the circuit closers will be at all times held in frictional contact with the flanges on the cable drums.

Each conductor leading into and out of the signal box is split at an appropriate point in its length and one end of such split portion is fastened to a contact carried by one side wall of the signal box and similar to the contact 56 hereinbefore referred to at the end of the common power conductor 45, while the confronting ends of the split portion of each conductor, as well as the branch conductors 57 and 58, terminate in a contact 148 carried by the removable cover of the signal box. These contacts 148 each carries a blade 149 adapted to contact a similar blade 150 secured to the contacts of the adjacent end of the respective split portion. Thus, when the cover of the signal box is removed, the various circuits through such box are broken.

The various conductors leading out of the signal box and into the recorder casing and out of the recorder casing to the signal belt are in the form of cables. To eliminate wear on these cables when the same are dragged about from one place to another and to give the same the maximum flexibility I employ a wrapping or binding such as shown in Figs. 22 and 23. This wrapping or binding is composed of a metallic strip 151 wound about the respective cable in convolutions or spiral form and of oval configuration in cross section. By so forming the wrapping or binding in cross section, no sharp edges are presented to the insulation on the cable in the flexing of the latter, while in the dragging or pulling of the cable each convoluted portion of the strip presents the minimum surface to the ground.

From the foregoing description taken in connection with the accompanying drawings, the construction, mode of operation and manner of employing my improved signaling system will be readily apparent to those skilled in the art to which the invention appertains. While I have herein shown and described one particular embodiment of the system by way of illustration and certain instrumentalities for carrying the same into practice, I wish it to be understood that I do not confine myself to the precise construction of the various mechanisms and the relative arrangement of such herein described and delineated, as modification and variation may be made within the scope of the claims and without departing from the spirit of the invention.

I claim:

1. In a signal system, a main circuit, a motor connected in said main circuit, a local signal circuit, a relay controlling said signal circuit and connected in said main circuit and normally energized to hold the local signal circuit open and adapted to close the local signal circuit in the event of failure of current in the main circuit, a fluid compressor driven from said motor, a tank connected with said compressor, audible signals connected to said tank, and means connected across said main circuit and controlling said audible signals.

2. In a signal system, a main circuit, a motor connected in said main circuit, a local signal circuit, a relay controlling said signal circuit and connected in said main circuit and normally energized to hold the local signal circuit open and adapted to close the local signal circuit in the event of failure of current in the main circuit, a fluid compressor driven from said motor, a tank connected with said compressor, audible signals connected to said tank, means connected across said main circuit and controlling said audible signals, and means controlling said last-named means to selectively energize the same.

3. In a signal system, a main circuit, a motor in shunt with said main circuit, a local signal circuit, a relay controlling said signal circuit and connected in shunt with said main circuit and holding said local signal circuit normally open and adapted to close the same in the event of failure of current in the main circuit, and audible signals controlled by said motor.

4. In a signal system, a main circuit, a motor in shunt with said main circuit, a local signal circuit, a relay controlling said signal circuit and connected in shunt with said main circuit and holding said local signal circuit normally open and adapted to close the same in the event of failure of current in the main circuit, audible signals controlled by said motor, and means for rendering said signals operative selectively from said motor.

5. In a signal system, a main circuit, audible signals, means connected across said main circuit for rendering said signals operative, visual signals connected in circuit with said means respectively, and means for selectively energizing the respective visual signals and corresponding means.

6. In a signal system, a main circuit, audible signals, electroresponsive devices controlling said audible signals respectively, visual signals, a circuit for said signals, and electroresponsive devices controlling said visual signals respectively and adapted to be connected in series with certain of said first-named electroresponsive devices respectively whereby the visual signals and the corresponding audible signals will be energized simultaneously.

7. In a signal system, a main circuit, audible signals, electroresponsive devices controlling said audible signals respectively, visual signals, a circuit for said signals, electroresponsive devices controlling said visual signals respectively and adapted to be connected in series with certain of said first-named electroresponsive devices respectively whereby the visual signals and the corresponding audible signals will be energized simultaneously, and means for energizing said last-named electroresponsive devices and the corresponding first-named electroresponsive devices selectively.

8. In a signal system, a main circuit, audible signals, electroresponsive devices controlling said audible signals respectively, visual signals, a circuit for said signals, electroresponsive devices controlling said visual signals respectively and adapted to be connected in series with certain of said first-named electroresponsive devices respectively whereby the visual signals and the corresponding audible signals will be energized simultaneously, and portable means controlling the energization of said last-named electroresponsive devices and the corresponding first-named electroresponsive devices respectively.

In testimony whereof I affix my signature in presence of two witnesses.

HARRY A. YATES.

Witnesses:
E. EDMONSTON, Jr.,
JOHN J. MCCARTHY.